(12) United States Patent
Li et al.

(10) Patent No.: US 12,447,583 B2
(45) Date of Patent: Oct. 21, 2025

(54) DIGITAL TWIN CONTROL SYSTEM FOR PRODUCT PROCESSING QUALITY

(71) Applicant: China University of Petroleum(East China), Qingdao (CN)

(72) Inventors: Gan Li, Qingdao (CN); Yixin Zhao, Qingdao (CN); Guoqing Hu, Qingdao (CN); Shibo Wu, Qingdao (CN); Longyang Wang, Qingdao (CN); Renjie Ji, Qingdao (CN); Yonghong Liu, Qingdao (CN)

(73) Assignee: China University of Petroleum(East China), Qingdao (CN)

( * ) Notice: Subject to any disclaimer, the term of this patent is extended or adjusted under 35 U.S.C. 154(b) by 0 days.

(21) Appl. No.: 19/213,598

(22) Filed: May 20, 2025

(65) Prior Publication Data

US 2025/0276421 A1 Sep. 4, 2025

(30) Foreign Application Priority Data

Dec. 3, 2024 (CN) .......................... 202411754730.0

(51) Int. Cl.
*G05B 19/418* (2006.01)
*B24B 49/02* (2006.01)

(52) U.S. Cl.
CPC ........ *B24B 49/02* (2013.01); *G05B 19/41875* (2013.01); *G05B 2219/32368* (2013.01); *G05B 2219/45161* (2013.01)

(58) Field of Classification Search
None
See application file for complete search history.

(56) References Cited

U.S. PATENT DOCUMENTS 9,056,368 B2 * 6/2015 Stork Genannt Wersborg ............ B23K 26/02
10,930,037 B2 * 2/2021 Namiki ................... G06F 18/41
(Continued)

FOREIGN PATENT DOCUMENTS

| CN | 116520772 A | 8/2023 |
| CN | 118331175 A | 7/2024 |
| CN | 118656983 A | 9/2024 |

OTHER PUBLICATIONS

Böttjer, Till, et al., "A review of unit level digital twin applications in the manufacturing industry", CIRP Journal of Manufacturing Science and Technology, Available online Jul. 3, 2023, pp. 162-189, vol. 45.
(Continued)

*Primary Examiner* — Jason Lin
(74) *Attorney, Agent, or Firm* — Muncy, Geissler, Olds & Lowe, P.C.

(57) ABSTRACT

The present invention belongs to the field of quality control of processed products, and discloses a digital twin control system for product processing quality. The digital twin control system establishes a real-time interactive digital twin system completely matched with an actual processing system according to the working principle of a CNC (Computer Numerical Control) system and the control strategy of a feedback loop of each moving part of the machine tool, extracts real-time following errors of each moving part of the machine tool during processing under different load fluctuations with respect to control needs for product processing quality, and establishes a dynamic digital twin control system for product processing quality through point-to-point real-time mapping, so as to achieve real-time monitoring of product quality. Processing parameters under stable following errors can be obtained based on the established (Continued)

digital twin control system to achieve real-time control of product processing quality.

1 Claim, 6 Drawing Sheets

(56) References Cited

U.S. PATENT DOCUMENTS

| | | | | |
|---|---|---|---|---|
| 11,474,512 | B2* | 10/2022 | Seguchi | B23K 26/03 |
| 11,500,360 | B2* | 11/2022 | Izumi | G06N 3/08 |
| 11,565,344 | B2* | 1/2023 | Watanabe | B23K 26/046 |
| 11,691,219 | B2* | 7/2023 | Nakamura | B23K 26/38 |
| | | | | 219/121.6 |
| 11,806,825 | B2* | 11/2023 | Edwards | B25J 9/1633 |
| 2005/0092722 | A1* | 5/2005 | Dane | H01S 3/235 |
| | | | | 219/121.73 |
| 2012/0191235 | A1* | 7/2012 | Shin | G06Q 10/04 |
| | | | | 700/104 |
| 2013/0155483 | A1* | 6/2013 | Margalit | G02F 1/093 |
| | | | | 359/280 |
| 2015/0323923 | A1* | 11/2015 | Takabe | G05B 19/19 |
| | | | | 700/186 |
| 2017/0148102 | A1* | 5/2017 | Franke | G06Q 30/0601 |
| 2017/0270434 | A1* | 9/2017 | Takigawa | B23K 26/38 |
| 2020/0133246 | A1* | 4/2020 | Kawahara | G05B 19/4185 |
| 2024/0053725 | A1 | 2/2024 | Bretschneider | |

OTHER PUBLICATIONS

Wang, Qi, et al., "A tool wear prediction and monitoring method based on machining power signals", The International Journal of Advanced Manufacturing Technology, pp. 5387-5401, Published online: Nov. 20, 2023, Springer.

Shen, Tao, et al., "Digital twins in additive manufacturing: a state-of-the-art review", The International Journal of Advanced Manufacturing Technologym, Published online Feb. 1, 2024, pp. 63-92, vol. 131, Springer.

Kreuzer, Tim, et al., "Artificial intelligence in digital twins—A systematic literature Review", Data & Knowledge Engineering, Available online Apr. 3, 2024, 19 pages, vol. 151, 102304, Published by Elsevier B.V.

* cited by examiner

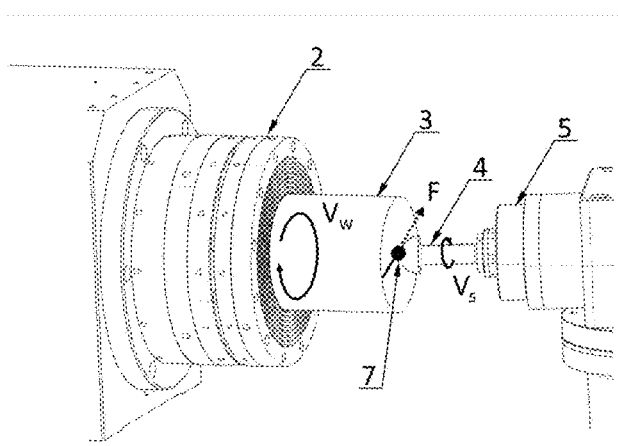
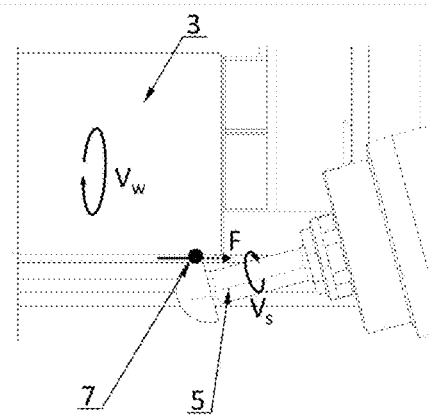
Fig. 3             Fig. 4
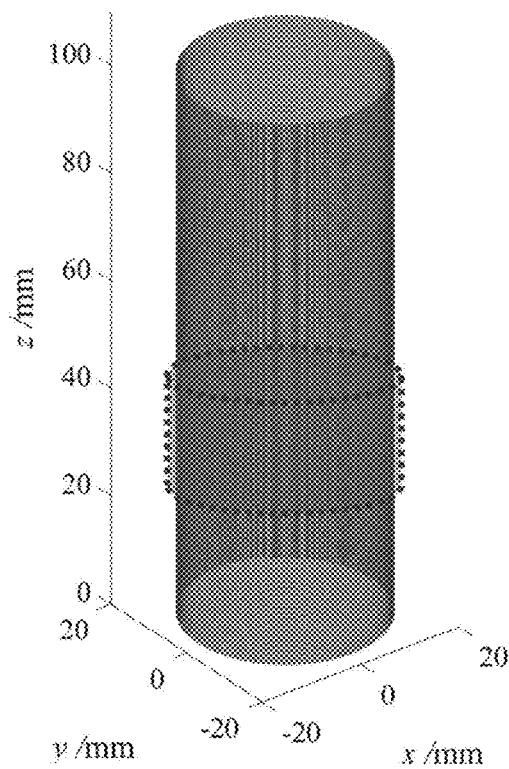
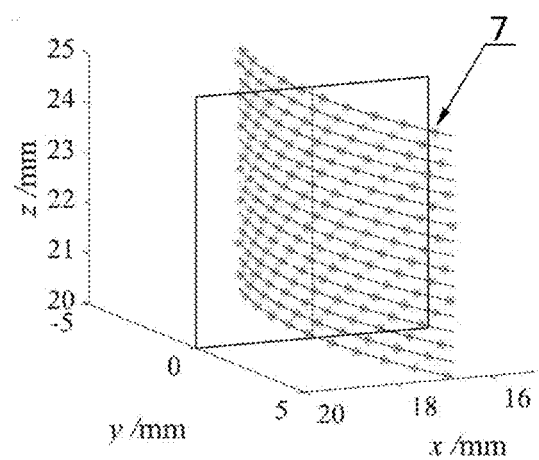
Fig. 5             Fig. 6

DIGITAL TWIN CONTROL SYSTEM FOR PRODUCT PROCESSING QUALITY

TECHNICAL FIELD

The present invention belongs to the field of quality control of processed products, and particularly relates to a digital twin real-time control system for processing quality of complex surfaces.

BACKGROUND

Real-time and effective monitoring of the processing status and processing quality of products during production and manufacturing is of great significance for ensuring the processing quality of parts and increasing production efficiency. Changes in the production status often mean the instability during processing, which leads to the increase in additional cost such as tool wear, reduction of workpiece quality, etc. In the past, various methods for processing status monitoring were proposed. However, due to complexity and time-varying of the processing course, traditional methods are not easy to achieve real-time and accurate monitoring.

Over the past few decades, the concept of digital twins has been widely recognized by various industries and has greatly changed the industrial field. Through the combination of the CNC (Computer Numerical Control) system of machine tools with the digital twins, the performance of the machine tools can be dynamically predicted in combination with status monitoring, fault diagnosis, performance prediction, parameter optimization, etc., and decision making and optimization instructions are formed. Based on the instruction data of the CNC system of the machine tools, technologies such as intelligent interpolation, servo tuning, error compensation, etc. are adopted to autonomously control the operation process of the intelligent machine tools during automatic execution. This enables the intelligent machine tools to have historical and real-time data, database models, and decision making and execution data, and to adapt to changes in processing conditions and machine tool statuses. At present, status monitoring, simulation and visualization constitute the current main applications of the digital twins in intelligent manufacturing. Product quality can be analyzed and improved through the application of the digital twin technologies in part manufacturing.

However, the comprehensive modeling cost of the digital twins is high. Walker et al. summarized the main challenge of developing the digital twins for CNC processing in the literature "A tool wear prediction and monitoring method based on machining power signals". The results show that achieving a digital twin system requires a large amount of sensor measurement data, which needs to introduce a large number of sensors into a manufacturing system to monitor valid data in real time. Wang et al. indicated in the literature "A tool wear prediction and monitoring method based on machining power signals" that adding the sensors can guarantee accuracy, but the cost was high and it was difficult to apply in industry. In addition, to process mass data and provide timely feedback, the CNC system of the machine tools needs to have extremely strong computing capabilities, which inevitably increases the production cost of the entire manufacturing system. Traditional digital twin systems generally require a plurality of physical sensors to monitor various phenomena related to the system, such as temperature and vibration. However, Shen et al. considered in the literature "Digital twins in additive manufacturing: a state-of-the-art review" that many traditional production systems were not provided with so many physical sensors by default. Therefore, once built, it is very difficult to modify the systems with built-in sensors. In addition, the digital twin system has very high requirements for the real-time interaction of data fusion. Kreuzer et al. considered in the literature "Artificial intelligence in digital twins—A systematic literature review" that real-time mapping is a key function of the digital twin system. However, Böttjer et al. indicated in the literature "A review of unit level digital twin applications in the manufacturing industry" that the current related applications of the digital twins paid little attention to the real-time mapping of the digital twins. Due to the continuous changes in the status and the performance of the machine tools during operation, the digital twin system faces significant challenges in real-time prediction and optimization without achieving synchronous mapping with physical entities or processes.

SUMMARY

The present invention proposes a digital twin control system for product processing quality, which can effectively achieve the real-time control of the processing quality and the processing accuracy of products by extracting real-time following errors during processing through the digital twin system.

The present invention aims to overcome the technical defects and deficiencies of more requirements for the number of sensors and high modeling cost in the existing digital twin system for product processing quality, and aims at the fact that the accuracy of the machine tools may be changed under load statuses and the load acting on a moving system causes a large deviation between the real-time position of the moving system and an instruction position, thereby affecting the processing accuracy of the machine tools and reducing the processing quality of the products. The present invention directly takes the product processing quality as a control objective to construct the digital twin control system for product quality. The present invention can reduce the construction cost of the digital twin system and effectively achieve the real-time control of the processing quality and the processing accuracy of products by extracting real-time following errors during processing through the digital twin system.

The technical solution of the present invention is as follows:

A digital twin control system for product processing quality is provided, which establishes a real-time interactive digital twin system completely matched with an actual processing system according to the working principle of a CNC system of a machine tool and the control strategy of a feedback loop of each moving part of the machine tool, extracts real-time following errors of each moving part of the machine tool during processing under different load fluctuations with respect to control needs for product processing quality on this basis, and establishes a dynamic digital twin control system for product processing quality through point-to-point real-time mapping, so as to achieve real-time monitoring of product quality. Processing parameters under stable following errors can be obtained based on the established digital twin control system to achieve real-time control of product processing quality.

Specific steps are as follows:

step 1: constructing the digital twin control system for product processing quality with product quality as a control objective, considering that during actual processing, workpiece material interferes with a grinding wheel tool system to cause material deformation and final material removal, constructing the digital twin control system based on a control principle of the moving part of the machine tool, comprising physical entities, digital twin data, virtual entities, services and the links between components, with the physical entities being the moving entities of a CNC grinding machine, and accordingly constructing the digital twin control system for product quality;

analyzing the physical entities of the corresponding moving parts of the grinding wheel and a workpiece, and connecting the grinding wheel with a machine tool guide rail through a grinding spindle in the CNC grinding machine to form a subsystem connected by "grinding wheel—grinding spindle—X-axis of CNC machine tool"; connecting the workpiece with the machine tool guide rail through a workpiece spindle or C-axis to form a subsystem connected by "workpiece—workpiece spindle/C-axis—Z-axis of CNC machine tool"; and connecting the above two subsystems together through a machine tool body, distributing in a CNC machine tool coordinate system, moving in the CNC system of the machine tool through an instruction signal and achieving material removal to form the physical entities of the CNC grinding machine accordingly;

implementing mapping when the virtual entities are the physical entities; considering that the physical entities of the CNC grinding machine move in the CNC system of the machine tool through the instruction signal: sending, by the CNC grinding machine, the processing requirements of a product to the moving parts of the machine tool in the form of NC codes; sending a control instruction signal by the moving parts of the machine tool according to the processing requirements; converting, by a corresponding servo driver, the control instruction signal into a power signal of the corresponding moving part of the machine tool and driving the corresponding moving part of the machine tool to move; after the moving part of the machine tool moves, recording the real-time position of the moving part of the machine tool through a grating ruler and comparing with the control instruction signal of a servo controller, with a difference therebetween being a corresponding moving error; sending the moving error as a feedback signal to an IPC (Industrial Personal Computer) of the CNC grinding machine; adopting a corresponding PID (Proportional Integral Derivative) control strategy by the IPC of the CNC grinding machine according to the corresponding feedback signal; sending a corresponding control instruction signal to the servo driver again and driving the corresponding moving part of the machine tool to move until the moving error corresponding to the feedback signal reaches the control accuracy of an algorithm; repeating the above control process by the digital twin control system to finally achieve the processing requirements of the corresponding product; creating the virtual entities completely corresponding to the physical entities accordingly, and achieving real-time monitoring and optimization of the physical entities through the digital twin data;

the services comprise key information related to the entire digital twin control system and provide real-time update of the status changes in the physical entities and the virtual entities;

connection is a pipeline for transmitting the information between the physical entities and the virtual entities, and the physical entities provide real-time digital twin data for the virtual entities by using an information transmission technology;

the digital twin data comprises data from machine tool entities, and status, performance and control data from moving status sensors of the machine tool;

achieving, by the established digital twin control system, the real-time interaction between the virtual entities and the physical entities in a grinding process through the digital twin data and interlinks, and conducting real-time simulation and timely optimization, to achieve the accurate control of product quality in the grinding process;

step 2: acquiring real-time spatial data of the workpiece based on the digital twin control system with product quality as the control objective, achieving the precision processing of the workpiece by driving relative motion between the workpiece and the grinding wheel through a machine tool moving system; achieving the processing of a cylindrical surface in combination with the linear feed motion of the X-axis through the rotational motion of the workpiece and a grinding spindle; achieving the processing of a plane in combination with the linear feed motion of the Z-axis through the rotational motion of the workpiece and the grinding spindle; achieving the processing of a rotary symmetric surface in combination with the two-axis interpolation motion of the X-axis and the Z-axis through the rotational motion of the workpiece and the grinding spindle, and achieving the processing of a non-rotary symmetric complex surface through the three-axis interpolation motion of the X-axis, the Z-axis and the C-axis;

extracting the theoretical coordinates of each processing point through the digital twin control system accordingly based on that the surface formation of a CNC grinding machine product is closely related to point-to-point contact points between the tool and the workpiece during processing, and forming the spatial data distribution of the workpiece during processing through coordinate transformation, as shown in formula (1);

$$\begin{cases} X(t) = x_{actual}(t) \cdot \cos(c_{actual}(t)) \\ Y(t) = x_{actual}(t) \cdot \sin(c_{actual}(t)) \\ Z(t) = z_{actual}(t) \end{cases} \quad (1)$$

where $x_{actual}$, $z_{actual}$, and $c_{actual}$ represent actual positions where XZC coordinates pass through in the machine tool coordinate system during grinding processing respectively, and $X(t)$, $Y(t)$, and $Z(t)$ represent the spatial data distribution of workpiece coordinates respectively;

step 3: calibrating parameters of the digital twin system during actual processing, a processing error is composed of two parts; one part is a processing principle error, and the other part is a dynamic error caused by a processing load, expressed as:

$$Err = f(V_s, V_w, V_f, a_p) + g(E_X, E_Z, E_C, u) + h(F, E) + j(w) \quad (2)$$

where f represents the principle error of grinding processing, comprising a surface grinding mark caused by surface residual height resulting from grinding wheel speed $V_s$, workpiece speed $V_w$, feed speed $V_f$ and grinding depth $a_p$; g represents the principle error of machine tool motion, comprising the XZC guide rail accuracy $E_X$, $E_Z$ and $E_C$ of the machine tool, and external interference u during processing; h represents elastoplastic deformation caused by the inherent characteristic E of the material under the action of a grinding force F, j represents elastic recovery, and w represents an influencing parameter of the degree of elastic recovery of the material;

under an ideal status, the processing course is a stationary process; when a planar workpiece is processed, a tool-workpiece contact point is on an ideal trajectory, a processing surface is in a pure flat status, and an error value should be 0; if only the dynamic characteristics of the machine tool are considered, when the planar workpiece is processed, a grinding point of the machine tool fluctuates near the ideal trajectory, and the processing error value fluctuates near 0; when difficult-to-process material is processed, due to the difficulty in processing of the material, a large processing load is introduced during processing, causing great fluctuation of the tool-workpiece contact point of the machine tool near the ideal trajectory, and accordingly, the processing error is expressed as:

$$Err = EX(F, E, V_s, V_f, a_p, u) + \\ EZ(F, E, V_w, a_p, u) + EC(F, E, V_w, u) \quad (3)$$

where EX represents the influence of the grinding force F, the inherent characteristic E of the material, the grinding wheel speed $V_s$, the feed speed $V_f$, the grinding depth $a_p$, and the external interference u on an X-axis error; EZ represents the influence of the grinding force F, the inherent characteristic E of the material, the workpiece speed $V_w$, the grinding depth $a_p$ and the external interference u on a Z-axis error; EC represents the influence of the grinding force F, the inherent characteristic E of the material, the workpiece speed $V_w$, and the external interference u on a C-axis error;

by calibrating the parameters of the digital twin control system, establishing a correlation of the processing load—output voltage; wherein when the moving part of the machine tool is in a balanced position, a position error and output power are approximately zero; during loading, the load on the moving part is increased, generating a forward load Fe+; at this time, the output power is less than an applied load, and the position Xe of the moving part deviates forwardly from an original instruction position; to ensure that the instruction position of the moving part is relatively stable, the output power of the moving part is continuously increased, and the motor power is increased rapidly and maintains new stable power output; after the motor power is increased to be consistent with the external load, the position Xe returns to the original instruction position; when the external load is removed, the load on the moving part is decreased; at this time, the output power of the motor is higher than that of the external load, and the position Xe of the moving part deviates reversely from the original instruction position; to ensure that the instruction position of the moving part is stable, the output power of the motor is decreased, and the power is decreased rapidly and maintains new stable power output; after the motor power is reduced to be consistent with the external load, the guide rail position Xe returns to the original instruction position;

accordingly, determining a relationship of the load, the current of a guide rail motor and the position error of the guide rail through load calibration, and then, obtaining real-time load change during processing according to the real-time changes of the current of the guide rail motor and the position error of the guide rail during grinding processing; extracting a real-time position signal of the machine tool through the digital twin control system, and judging the processing status of the workpiece surface through the change conditions, under the machine tool coordinates, of the position signals of the X-axis, the Z-axis and the C-axis under the machine tool coordinates, to obtain the processing quality of the workpiece:

$$\begin{cases} x_{actual}(t) &= x_{instruction}(t) + x_{pe}(t) \\ z_{actual}(t) &= z_{instruction}(t) + z_{pe}(t) \\ c_{actual}(t) &= c_{instruction}(t) + c_{pe}(t) \end{cases} \quad (4)$$

where $x_{actual}$, $z_{actual}$ and $c_{actual}$ represent the actual positions where the XZC coordinates pass through under the machine tool coordinate system during grinding processing respectively; $x_{instruction}$, $z_{instruction}$ and $c_{instruction}$ represent the instruction positions of the XZC coordinates in an NC program after discretized by the NC program of the machine tool respectively; and $x_{pe}$, $z_{pe}$ and $c_{pe}$ represent the influences on three XZC coordinates during grinding processing respectively;

accordingly, converting the real-time position signal of the machine tool into spatial coordinates:

$$\begin{cases} X(t) &= x_{actual}(t) \cdot \cos(c_{actual}(t)) \\ Y(t) &= x_{actual}(t) \cdot \sin(c_{actual}(t)) \\ Z(t) &= z_{actual}(t) \end{cases} \quad (5)$$

accordingly, controlling the product processing quality in real time through the established digital twin control system;

step 4: obtaining the real-time processing quality of the product through the digital twin control system achieving real-time monitoring and real-time control of the product processing quality according to the digital twin control system, then adjusting the processing parameters in real time during processing, and changing the processing load to improve the product processing quality;

in the digital twin control system, regarding a difference between a theoretical position and a real-time position as a result of deviation of actual coordinate values from instruction coordinate values under the dynamic characteristics of the machine tool, a grinding parameter and material responses during processing:

$$\begin{cases} x_{pe}(t) & = X(F, E, V_s, V_f, a_p, u) \\ z_{pe}(t) & = Z(F, E, V_w, a_p, u) \\ c_{pe}(t) & = C(F, E, V_w, u) \end{cases} \quad (6)$$

where $X(F, E, V_s, V_f, a_p, u)$ represents the influence of the grinding force F, the inherent characteristic E of the material, the grinding wheel speed $V_s$, the feed speed $V_f$, the grinding depth $a_p$ and the external interference u on the deviation of the actual coordinate values of the X-axis from instruction coordinates; $Z(F, E, V_w, a_p, u)$ represents the influence of the grinding force F, the inherent characteristic E of the material, the workpiece speed $V_w$, the grinding depth $a_p$ and the external interference u on the Z-axis error; $C(F, E, V_w, u)$ represents the influence of the grinding force F, the inherent characteristic E of the material, the workpiece speed $V_w$ and the external interference u on the C-axis error;

extracting the error values of the moving parts of the machine tool respectively to obtain the error distribution results of product surface data:

$$\begin{cases} X(t) = x_{pe}(t) \cdot \cos(c_{pe}(t)) \\ Y(t) = x_{pe}(t) \cdot \sin(c_{pe}(t)) \\ Z(t) = z_{pe}(t) \end{cases} \quad (7)$$

accordingly, achieving real-time control of the product processing quality.

It should be noted that the processing of the cylindrical surface is achieved in combination with the linear feed motion of the X-axis through the rotational motion of the workpiece and the grinding spindle; the processing of the plane is achieved in combination with the linear feed motion of the Z-axis through the rotational motion of the workpiece and the grinding spindle; further, the processing of the rotary symmetric surface can be achieved in combination with the two-axis interpolation motion of the X-axis and the Z-axis through the rotational motion of the workpiece and the grinding spindle, and the processing of the non-rotary symmetric complex surface can be achieved through the three-axis interpolation motion of the X-axis, the Z-axis and the C-axis. Therefore, the present invention can achieve the control of the processing quality of workpieces with any shape without any additional sensors.

Compared with the prior art, the present invention has the beneficial effects that the traditional machine tool control mode only achieves the precision control of the moving system through a closed-loop control strategy based on the grating ruler, which is a data-driven finite precision control method. When an actuating mechanism deviates due to changes in external conditions such as process parameters and processing material, the processing accuracy and the control stability of the product are directly affected. Thus, the present invention takes the product quality as the control objective and directly takes the real-time following error of the moving parts for the processing course during product processing as the control objective to form the digital twin control system for product processing quality and achieve multi-closed-loop real-time control of product processing quality.

DESCRIPTION OF DRAWINGS

FIG. 3 shows a processing course of an end surface workpiece product in an embodiment of the present invention.

FIG. 4 shows a processing course of a cylindrical surface workpiece product in an embodiment of the present invention.

FIG. 5 shows a moving path of a tool-workpiece contact point during product processing in an embodiment of the present invention.

FIG. 6 is a corresponding distribution diagram of a tool-workpiece contact point during product processing in an embodiment of the present invention.

In the figures: 1 X-axis feed system; 2 workpiece spindle/C-axis; 3 workpiece; 4 grinding wheel; 5 grinding spindle; 6 Z-axis feed system; 7 processing contact point; 101 tool-workpiece contact point; 102 contact point moving process during processing; 103 tool-workpiece un-contact point; 201 first control parameter change point; 202 second control parameter change point.

DETAILED DESCRIPTION

Specific embodiments of the present invention are further described below in combination with the drawings and the technical solution.

Because the CNC grinding machine adds the moving parts of the grinding spindle compared with a lathe, the CNC grinding machine is taken as an example for illustration here. It should be noted that the digital twin control system for product processing quality in the present invention is applicable to not only the grinding machine, but also the lathe.

Specific embodiments of the present invention are described below in detail in combination with the technical solution and the drawings.

Figure 1:
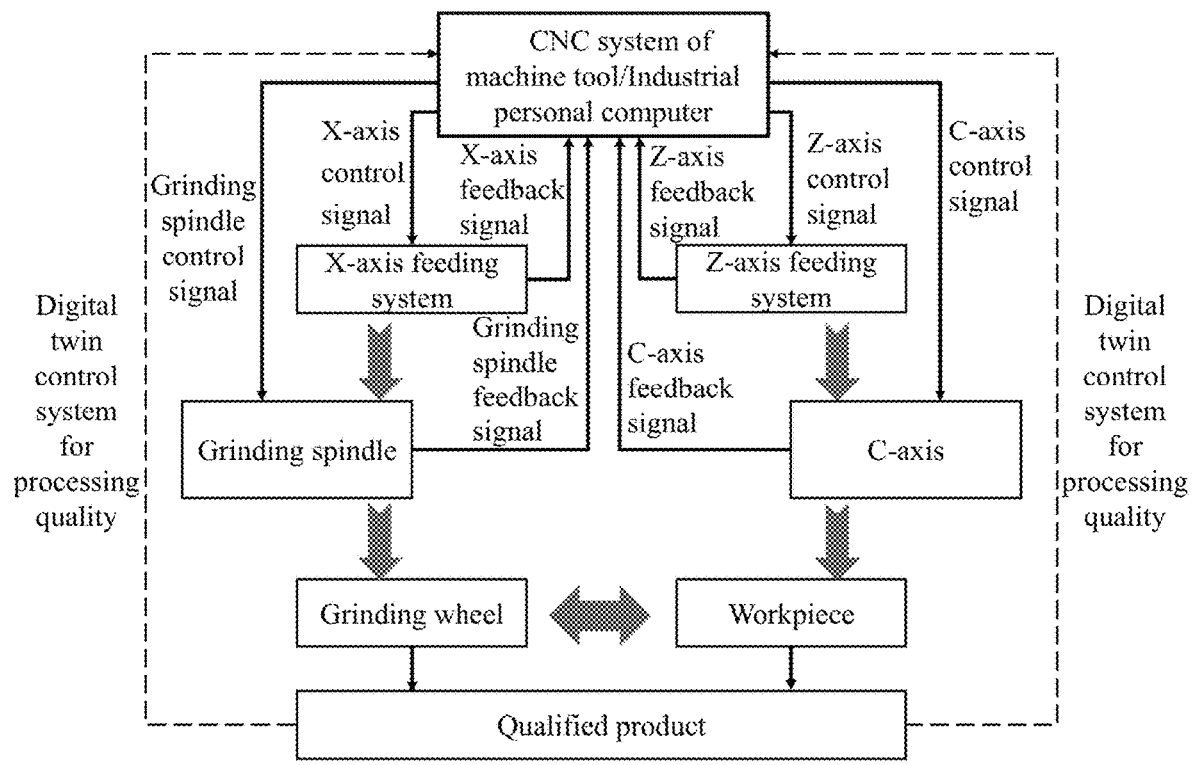
FIG. 1 is a flow chart for construction of a digital twin control system of the present invention and also a main technical solution diagram of the present invention.

Step 1: Constructing the Digital Twin Control System for Product Processing Quality The digital twin control system is constructed as shown in FIG. 1 based on the control principle of the moving parts of the machine tool; the CNC grinding machine sends the processing requirements of a product to the moving parts in the form of NC codes; the moving parts send a control instruction signal according to the processing requirements; and a corresponding servo driver converts a control instruction into a power signal (current and voltage values) of the corresponding moving part and drives the corresponding moving part to move. After a moving system moves, the real-time position of the moving part is recorded through a grating ruler and compared with the control instruction signal of a controller, with a difference therebetween being a corresponding moving error; the moving error as a feedback signal is sent to an IPC; the IPC adopts an appropriate PID control strategy according to the corresponding feedback signal, sends a corresponding control instruction signal to the servo driver again and drives the corresponding moving part to move until the moving error corresponding to the feedback signal of the system reaches the control accuracy of an algorithm. The control system repeats the above control process to finally achieve the processing requirements of the corresponding product.

The CNC grinding machine comprises two linear moving systems of an X-axis and a Z-axis and two rotational moving systems of a grinding spindle and a C-axis. The physical entities are the moving entities of the CNC grinding machine, and provide a mechanism and data basis for the digital twin model. The digital twin data is composed of the following real-time data: data from machine tool entities (such as position, vibration, workpiece material properties, geometric data, etc); and status, performance and control data from decision making control (such as machine tool displacement, speed, current and voltage data, process parameter data, etc.). Accordingly, the digital twin control system for product processing quality is constructed through the control signal of each moving system.

By using information transmission technologies, the physical entities provide real-time processing data for virtual entities, collect relevant physical process information such as physics, heat, vibration, voltage, current, etc. during processing, and map a processing mechanism to the virtual entities. Meanwhile, real-time conditions monitored in the physical entities are transmitted to a service system, thereby guiding the real-time monitoring of a grinding status. The virtual entities are monitored by the service system and developed continuously along with the service system. During processing, in order to ensure the processing quality of the workpiece and reduce the corresponding control cost at the same time, each link in the operation process of the machine tool needs to be controlled reasonably.

The existing control system of the CNC machine tool achieves the precision control of the moving systems through a closed-loop control strategy, which is a data-driven finite precision control method. When an actuating mechanism deviates due to changes in external conditions such as process parameters and processing material, the processing accuracy and the control stability of the product are directly affected. This is a semi-open-loop control strategy based on workpiece quality for machine tool operators. The present invention directly takes product quality as a control objective, fully considers the relationship of a tool-workpiece system in grinding and forms the digital twin control system for product quality.

Figure 2:
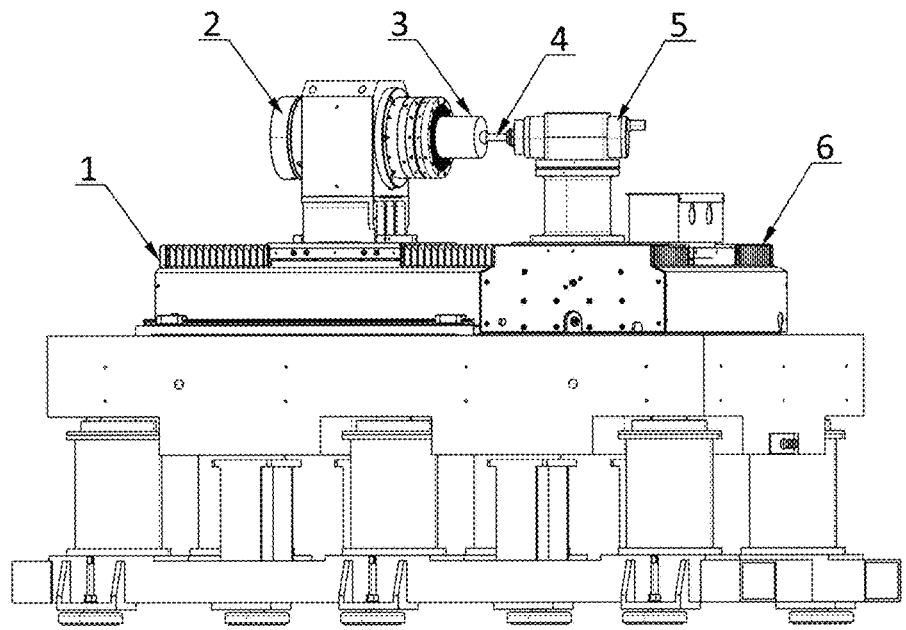
FIG. 2 shows main moving parts of a CNC machine tool in an embodiment of the present invention.

Main moving parts of the CNC grinding machine in the present embodiment comprise two linear feed systems of an X-axis and a Z-axis of a guide rail and two rotational systems of a grinding spindle and a C-axis. As shown in FIG. 2, the C-axis is installed on the Z-axis feed system, and the grinding spindle is installed on the X-axis linear feed system.

Step 2: Acquiring Real-Time Spatial Data of the Workpiece Based on the Digital Twin Control System Machine tool accuracy mainly refers to the motion accuracy that can be achieved by the moving systems of the machine tool under a no-load status, but the machine tool accuracy may be changed under a load status. The moving systems have certain rigidity. A load acting on the moving system causes a large deviation between the real-time position of the moving system and an instruction position, thereby affecting the processing accuracy of the machine tools and reducing the processing quality of the products. The present invention takes product quality as a control objective. The processing course on an ultra-precision CNC grinding machine is shown in FIG. 3 and FIG. 4. The precision processing of the workpiece is achieved by driving relative motion between the workpiece and the grinding wheel through a machine tool moving system. The processing of a cylindrical surface is achieved in combination with the linear feed motion of the X-axis through the rotational motion of the workpiece and a grinding spindle; the processing of a plane is achieved in combination with the linear feed motion of the Z-axis through the rotational motion of the workpiece and the grinding spindle; and further, the processing of a rotary symmetric surface can be achieved in combination with the two-axis interpolation motion of the X-axis and the Z-axis through the rotational motion of the workpiece and the grinding spindle, and the processing of a non-rotary symmetric complex surface can be achieved through the three-axis interpolation motion of the X-axis, the Z-axis and the C-axis.

The specific application of the digital twin control system for product processing quality in the present invention is shown in FIG. 5 and FIG. 6. The theoretical coordinates of each processing point are extracted through the digital twin control system accordingly based on that the surface formation of a CNC grinding machine product is closely related to point-to-point contact points between a tool and the workpiece during processing, and the spatial data distribution of the workpiece during processing is formed through coordinate transformation, as shown in formula 8.

$$\begin{cases} X(t) = x_{actual}(t) \cdot \cos(c_{actual}(t)) \\ Y(t) = x_{actual}(t) \cdot \sin(c_{actual}(t)) \\ Z(t) = z_{actual}(t) \end{cases} \quad (8)$$

Where $x_{actual}$, $z_{actual}$, and $c_{actual}$ represent actual positions where XZC coordinates pass through in a machine tool coordinate system during grinding processing respectively, and X, Y and Z represent the spatial data distribution of workpiece coordinates respectively.

A processing path is formed as shown in FIG. 5. It is noted that the processing paths are all based on theoretical contact points during the processing of digital twin dismissal products, as shown in FIG. 6.

Step 3: Calibrating Parameters of the Digital Twin System

During actual processing, a processing error is composed of two parts; one part is a processing principle error, such as accuracy of machine tool guide rails, external interferences during processing, etc.; and the other part is a dynamic error caused by a processing load, such as following error fluctuation caused by changes in dynamic loads of the moving parts of the machine tool, which can be expressed as:

$$Err = f(V_s, V_w, V_f, a_p) + g(E_X, E_Z, E_C, u) + h(F, E) + j(w) \quad (9)$$

Where f represents the principle error of grinding processing, such as a surface grinding mark, etc. caused by surface residual height resulting from grinding parameters (grinding wheel speed $V_s$, workpiece speed $V_w$, feed speed $V_f$ and grinding depth $a_p$, etc.); g represents the principle error of machine tool motion, such as XZC guide rail accuracy $E_X$, $E_Z$ and $E_C$ of the machine tool, external interference u during processing, etc.; h represents elasto-plastic deformation caused by the inherent characteristic E of the material under the action of a grinding force F, and j represents subsequent elastic recovery, where w represents an influencing parameter of the degree of elastic recovery of the material.

Under an ideal status, the processing course is a stationary process; when a planar workpiece is processed, a tool-workpiece contact point is on an ideal trajectory, a processing surface should be in a pure flat status, and an error value should be 0; if only the dynamic characteristics of the machine tool are considered, when the planar workpiece is processed, a grinding point of the machine tool fluctuates near the ideal trajectory, and the processing error value should fluctuate near 0; when difficult-to-process material is processed, due to the difficulty in processing of the material, a large processing load is introduced during processing, causing great fluctuation of the tool-workpiece contact point of the machine tool near the ideal trajectory, and accordingly, the processing error can be expressed as:

$$Err = EX(F, E, V_s, V_f, a_p, u) + EZ(F, E, V_w, a_p, u) + EC(F, E, V_w, u) \quad (10)$$

where EX represents the influence of the grinding force F, the inherent characteristic E of the material, the grinding wheel speed $V_s$, the workpiece speed $V_w$, the feed speed $V_f$, the grinding depth $a_p$, the external interference u, etc. on an X-axis error; EZ represents the influence of the grinding force F, the inherent characteristic E of the material, the grinding wheel speed $V_s$, the workpiece speed $V_w$, the feed speed $V_f$, the grinding depth $a_p$, the external interference u, etc. on a Z-axis error; EC represents the influence of the grinding force F, the inherent characteristic E of the material, the grinding wheel speed $V_s$, the workpiece speed $V_w$, the feed speed $V_f$, the grinding depth $a_p$, the external interference u, etc. on a C-axis error.

Figure 7:
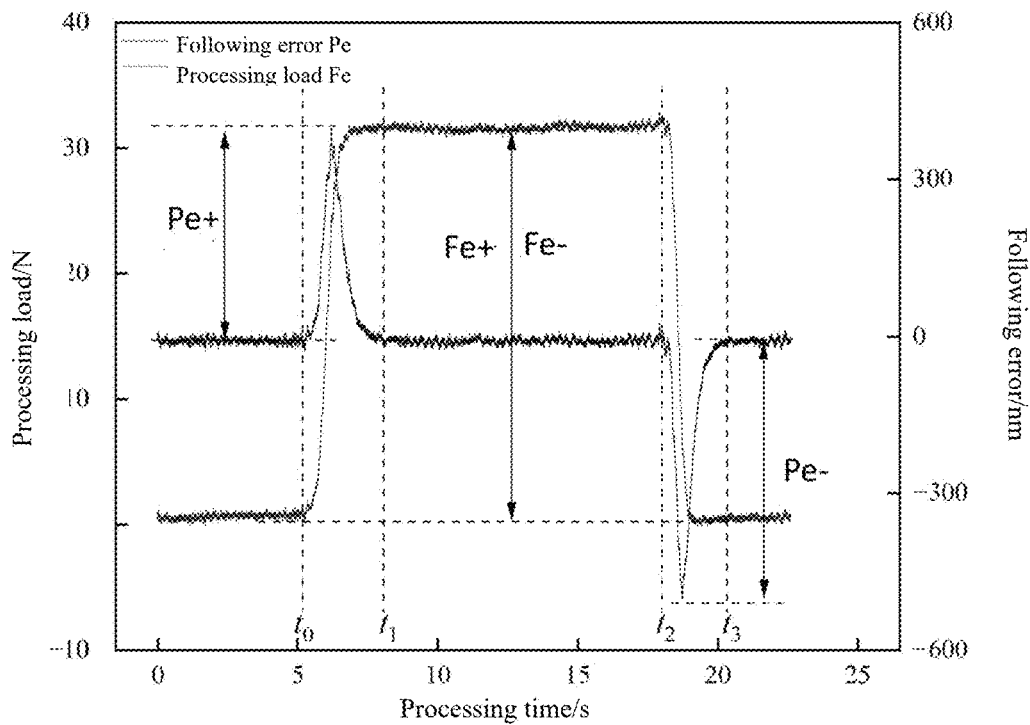
FIG. 7 shows a point-to-point correlation between a product processing error and a processing load in a digital twin control system in an embodiment of the present invention.

By calibrating the parameters of the digital twin system, a correlation of the processing load—output voltage is established, as shown in FIG. 7. At 0 to $t_0$, the moving part of the machine tool is in a balanced position, and a position error and output power are approximately zero. A constant load is applied at $t_0$ and kept until $t_2$. During loading, the load on the moving part of the machine tool is increased, generating Fe+; and at this time, the output power is less than the applied load, and the position Xe of the moving part deviates forwardly from an original instruction position. To ensure that the instruction position of the moving part is relatively stable, the output power of the moving part is continuously increased, and the motor power is increased rapidly and maintains new stable power output; after the motor power is increased to be consistent with the external load, the position Xe returns to the original instruction position; and until $t_1$, the moving part reaches a new balanced position. The following error of the moving part during loading is denoted as Xe+, and the change amount of the processing load is denoted as Fe+.

During the load holding time $t_1$-$t_2$, the moving part of the machine tool continues to maintain stable power output and relative stability of the instruction position at the balanced position. Until $t_2$, the external load is removed, and the load on the moving part is decreased. At this time, the output power of the motor is higher than that of the external load, and the position Xe of the moving part deviates reversely from the original instruction position. To ensure that the instruction position of the moving part is stable, the output power of the motor is decreased, and the power is decreased rapidly and maintains new stable power output. After the motor power is reduced to be consistent with the external load, the guide rail position Xe returns to the original instruction position; and until $t_3$, the moving part reaches the balanced position before loading. The following error of the moving part during unloading is denoted as Xe−, and the change amount of the processing load is denoted as Fe−.

The above process is repeated to obtain the correlation between the following error and the processing load, as shown in the following formula:

$$\begin{cases} Pe = 23.479 \times F_{load} - 17.289 \\ R^2 = 0.9818 \end{cases} \quad (11)$$

A real-time position signal of the machine tool is extracted accordingly in combination with the digital twin control system, and the processing status of the workpiece surface can be judged through the change conditions, under the machine tool coordinates, of the position signals of the X-axis, the Z-axis and the C-axis under the machine tool coordinates, to obtain the processing quality of the workpiece:

$$\begin{cases} x_{actual}(t) = x_{instruction}(t) + x_{pe}(t) \\ z_{actual}(t) = z_{instruction}(t) + z_{pe}(t) \\ c_{actual}(t) = c_{instruction}(t) + c_{pe}(t) \end{cases} \quad (12)$$

where $x_{instruction}$, $z_{instruction}$ and $c_{instruction}$ represent the instruction positions of the XZC coordinates in an NC program after discretized by the NC program of the machine tool respectively; $x_{actual}$, $z_{actual}$ and $c_{actual}$ represent the actual positions where the XZC coordinates pass through under the machine tool coordinate system during grinding processing respectively; and differences $x_{pe}$, $z_{pe}$ and $c_{pe}$ therebetween represent the influences on three XZC coordinates during grinding processing respectively.

Accordingly, the real-time position signal of the machine tool can be converted into spatial coordinates.

$$\begin{cases} X(t) = x_{actual}(t) \cdot \cos(c_{actual}(t)) \\ Y(t) = x_{actual}(t) \cdot \sin(c_{actual}(t)) \\ Z(t) = z_{actual}(t) \end{cases} \quad (13)$$

Accordingly, the product processing quality can be controlled in real time through the established digital twin control system.

Figure 8:
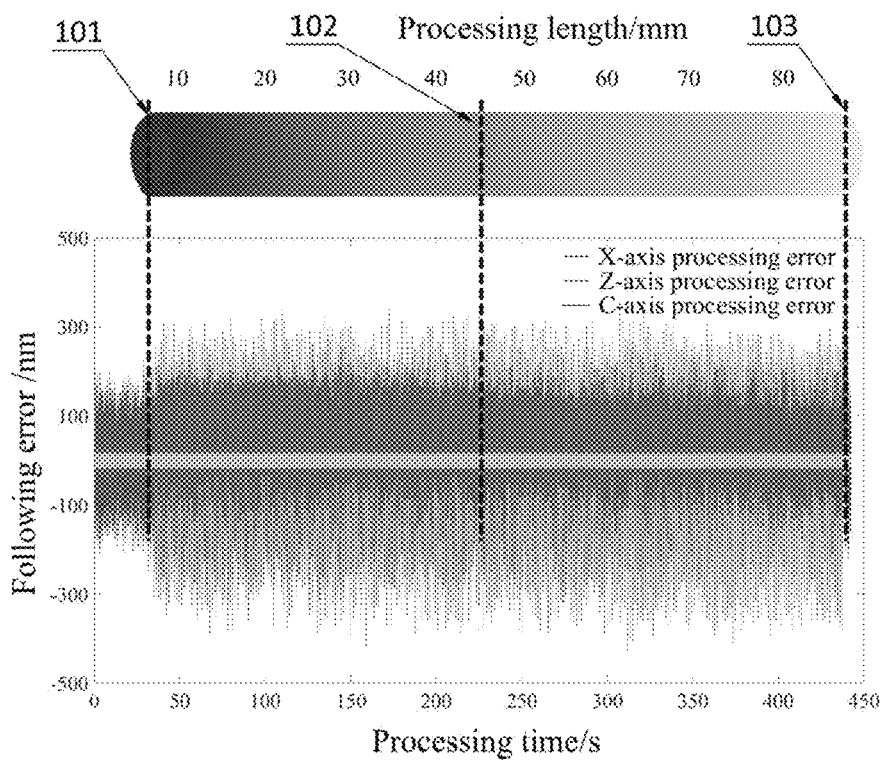
FIG. 8 shows real-time monitoring signals of a product surface morphology of a digital twin control system for the processing quality of a cylindrical surface workpiece in an embodiment of the present invention.
Figure 9:
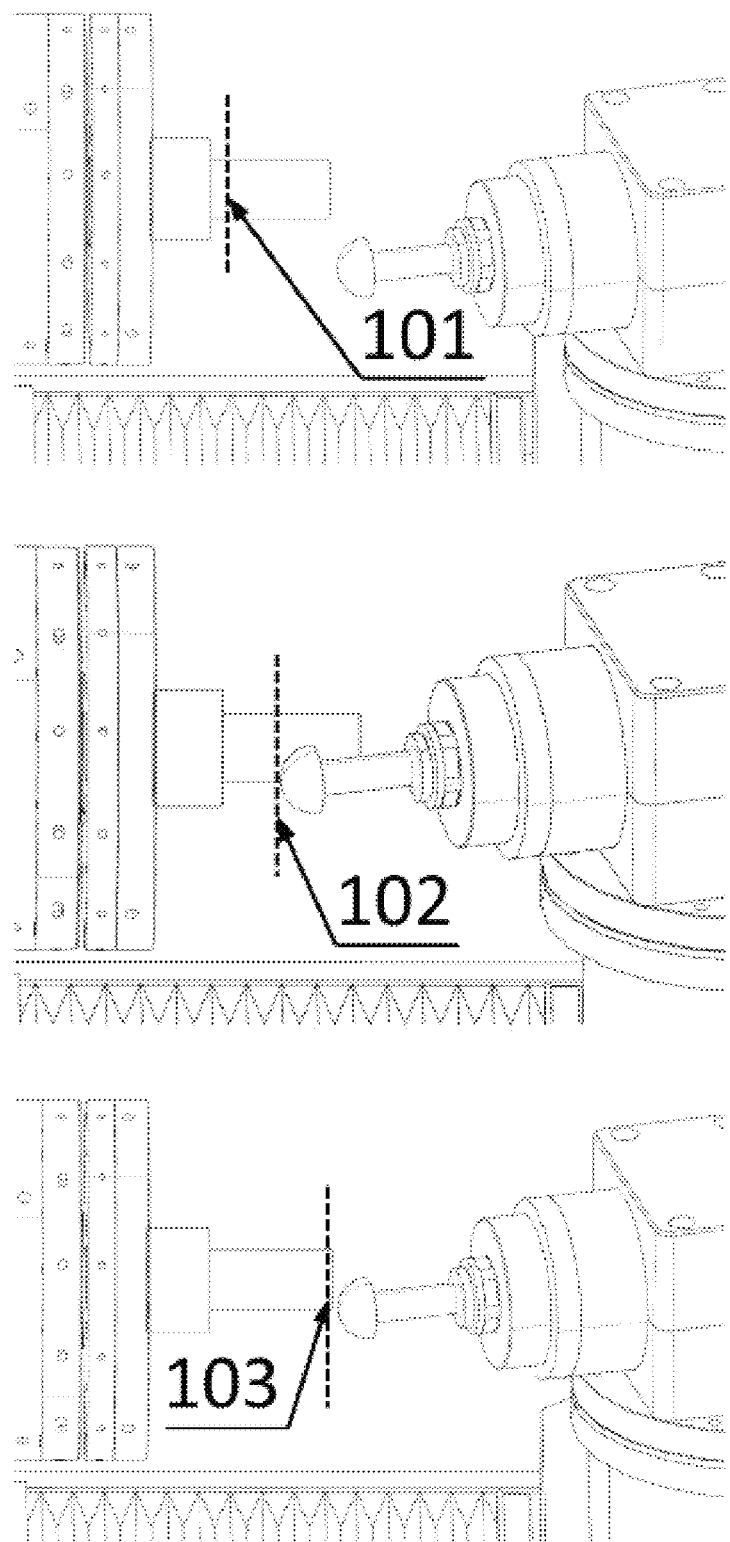
FIG. 9 shows statuses of a processing site of a digital twin control system for the processing quality of a cylindrical surface workpiece at different moments in an embodiment of the present invention.

Step 4: Obtaining the Real-Time Processing Quality of the Product Through the Digital Twin Control System Real-time monitoring of the product processing quality can be achieved according to the digital twin control system established in the present invention, with cylindrical surface processing as an example, as shown in FIG. 8 and FIG. 9. The digital twin system established by the present invention can not only accurately identify the start and end moments of workpiece processing, as shown by moments 101, 102 and 103 in the figure, but also correspond to the processing stages in reality.

Figure 10:
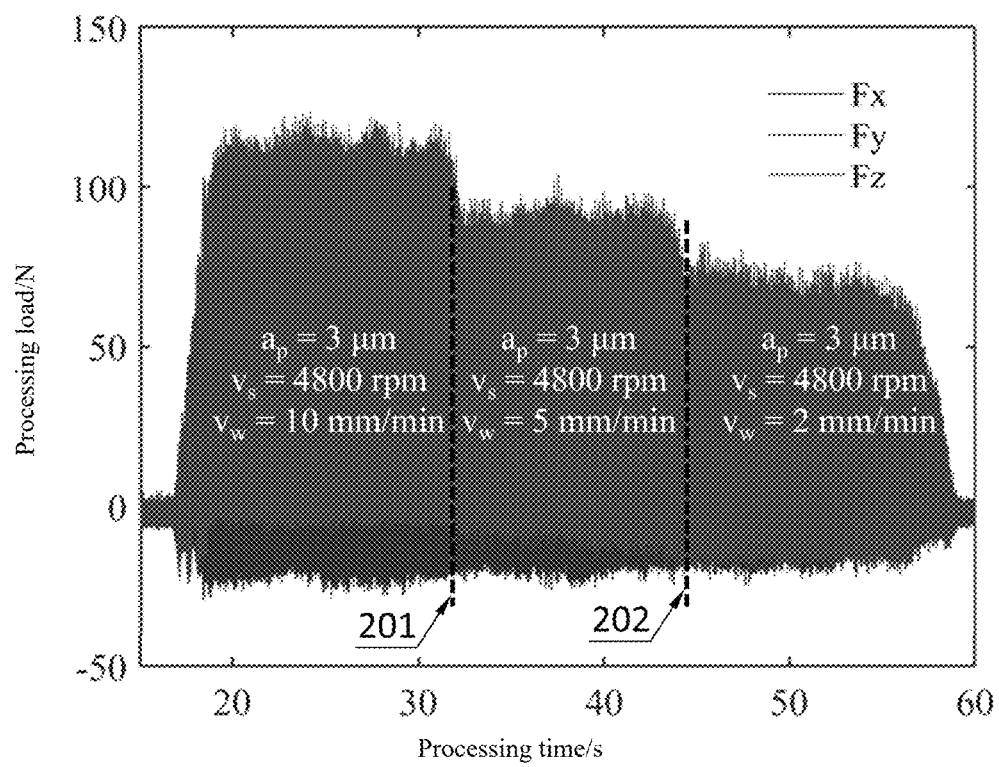
FIG. 10 shows real-time control parameters for a product processing error based on a digital twin control system in an embodiment of the present invention.
Figure 11:
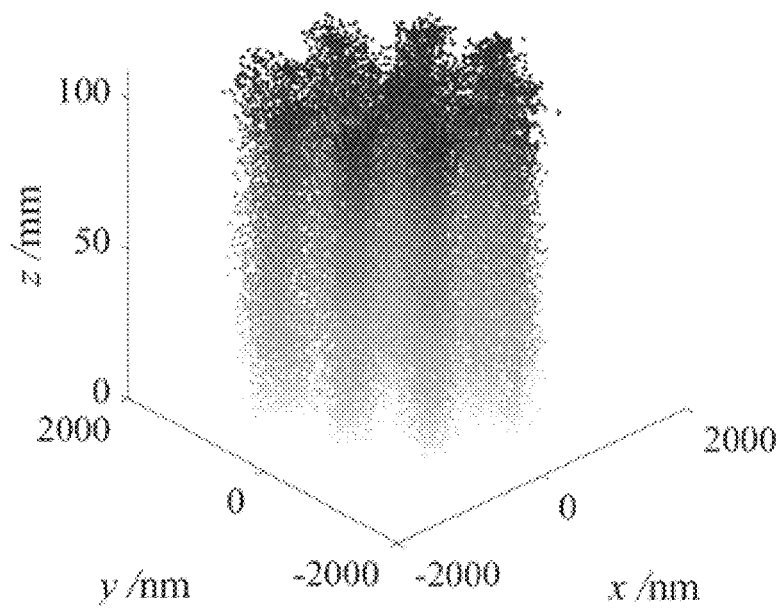
FIG. 11 shows the processing quality of a cylindrical surface product obtained through a digital twin control system in an embodiment of the present invention.

The digital twin control system established according to the present invention can also achieve real-time controllability of the processing load of the product, with cylindrical surface processing as an example, as shown in FIG. 10. When the processing parameter $V_w$ is changed to 10 mm/min, 5 mm/min and 2 mm/min respectively, the corresponding average processing loads are 28 N, 22 N and 13 N respectively. According to formula 11, the error values of the processing course can be calculated as 640 nm, 499 nm and 288 nm respectively. The processing parameter can be adjusted in real time during processing, and the processing load can be changed, thereby improving the processing quality of the product.

In the digital twin control system established in the present invention, a difference between a theoretical position and a real-time position can be regarded as a result of deviation of actual coordinate values from instruction coordinate values under the dynamic characteristics of the machine tool, a grinding parameter and material responses during processing:

$$\begin{cases} x_{pe}(t) = X(F, E, V_s, V_f, a_p, u) \\ z_{pe}(t) = Z(F, E, V_w, a_p, u) \\ c_{pe}(t) = C(F, E, V_w, u) \end{cases} \quad (14)$$

where $X(F, E, V_s, V_f, a_p, u)$ represents the influence of the grinding force F, the inherent characteristic E of the material, the grinding wheel speed $V_s$, the feed speed $V_f$, the grinding depth $a_p$ and the external interference u on the deviation of the actual coordinate values of the X-axis from instruction coordinates; $Z(F, E, V_w, a_p, u)$ represents the influence of the grinding force F, the inherent characteristic E of the material, the workpiece speed $V_w$, the grinding depth $a_p$ and the external interference u on the Z-axis error; $C(F, E, V_w, u)$ represents the influence of the grinding force F, the inherent characteristic E of the material, the workpiece speed $V_w$ and the external interference u on the C-axis error;

The error values of the moving parts of the machine tool are extracted respectively to obtain the error distribution results of product surface data:

$$\begin{cases} X(t) = x_{pe}(t) \cdot \cos(c_{pe}(t)) \\ Y(t) = x_{pe}(t) \cdot \sin(c_{pe}(t)) \\ Z(t) = z_{pe}(t) \end{cases} \quad (15)$$

Figure 12:
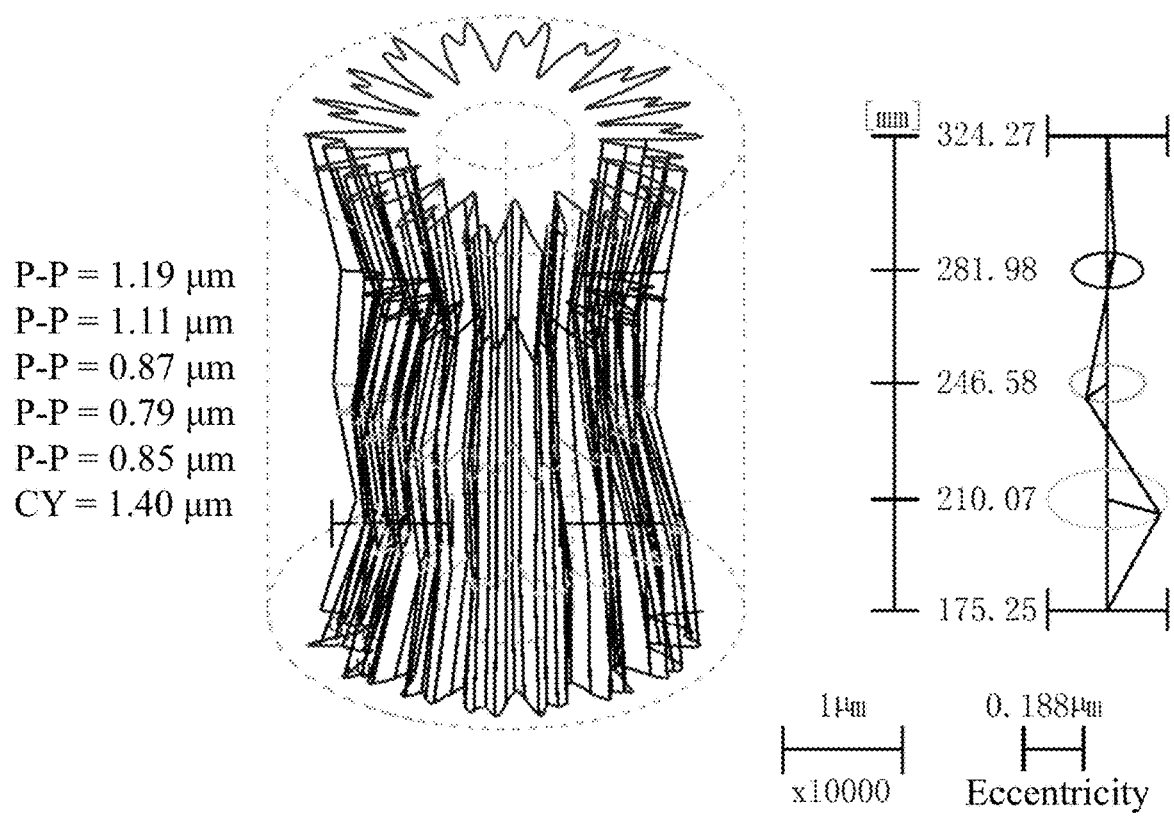
FIG. 12 shows the measured results of surface type accuracy of a cylindrical surface obtained through a digital twin control system in an embodiment of the present invention.
Figure 13:
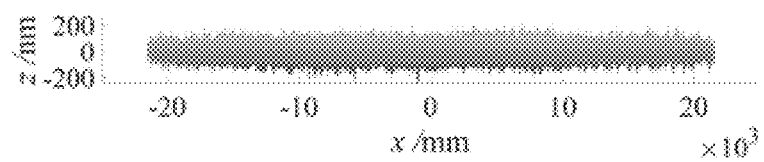
FIG. 13 shows the processing quality of an end surface product obtained through a digital twin control system in an embodiment of the present invention.
Figure 14:
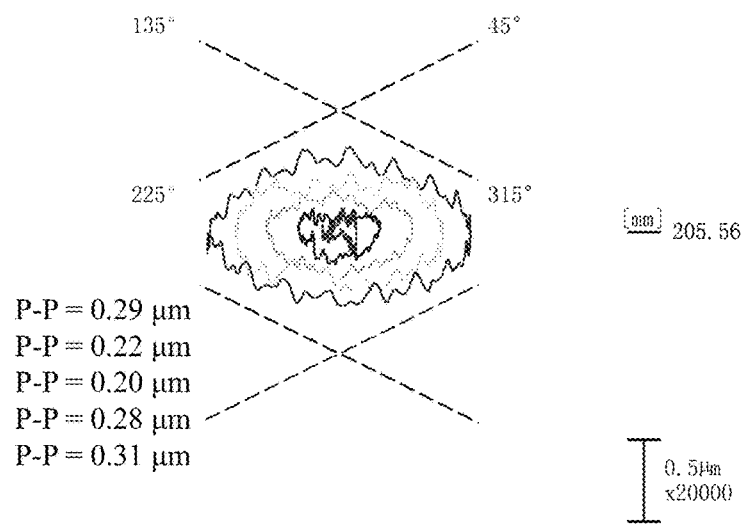
FIG. 14 shows the measured results of surface type accuracy of an end surface obtained through a digital twin control system in an embodiment of the present invention.

As shown in FIGS. 11-14, FIG. 11 shows the processing quality of a cylindrical surface product obtained through the digital twin control system; FIG. 12 shows the measured results of the surface type accuracy of the cylindrical surface; FIG. 13 shows the processing quality of an end surface product obtained through the digital twin control system, with a processing error of about 1.8 µm; and FIG. 14 shows the measured results of the surface type accuracy of the end surface, with the measured cylindricity being 1.4 µm. Accordingly, real-time control of the product processing quality can be achieved.

It should be noted that the processing of the cylindrical surface is achieved in combination with the linear feed motion of the X-axis through the rotational motion of the workpiece and the grinding spindle; the processing of the plane is achieved in combination with the linear feed motion of the Z-axis through the rotational motion of the workpiece and the grinding spindle; further, the processing of the rotary symmetric surface can be achieved in combination with the two-axis interpolation motion of the X-axis and the Z-axis through the rotational motion of the workpiece and the grinding spindle, and the processing of the non-rotary symmetric complex surface can be achieved through the three-axis interpolation motion of the X-axis, the Z-axis and the C-axis. Therefore, the present invention can achieve the control of the processing quality of workpieces with any shape without any additional sensors.

The invention claimed is:

1. A digital twin control method for product processing quality, comprising the following steps:
   step 1: constructing the digital twin control system for product processing quality
   with product quality as a control objective, during actual processing, workpiece material interferes with a grinding wheel tool system to cause material deformation and final material removal, constructing the digital twin control system based on a control principle of moving part of a CNC (Computer Numerical Control) grinding machine, comprising physical entities, digital twin data, virtual entities, services and links between components, with the physical entities being moving entities of the CNC grinding machine, and accordingly constructing the digital twin control system for product quality;
   analyzing the physical entities of corresponding moving parts of a grinding wheel and a workpiece, and connecting the grinding wheel with a CNC grinding machine guide rail through a grinding spindle in the CNC grinding machine to form a subsystem connected by grinding wheel—grinding spindle—X-axis of the CNC grinding machine; connecting the workpiece with the CNC grinding machine guide rail through a workpiece spindle or C-axis to form a subsystem connected by workpiece—workpiece spindle/C-axis—Z-axis of the CNC grinding machine; and connecting the above two subsystems together through a CNC grinding machine body, distributing in a CNC grinding machine coordinate system, moving in the CNC grinding machine through an instruction signal and achieving material removal to form the physical entities of the CNC grinding machine accordingly;

the virtual entities are real-time mapping of the physical entities; the physical entities of the CNC grinding machine move in the CNC system of the CNC grinding machine through the instruction signal: sending, by the CNC grinding machine, processing requirements of a product to the moving part of the CNC grinding machine in the form of NC codes; sending a control instruction signal by the moving part of the CNC grinding machine according to the processing requirements; converting, by a corresponding servo driver, the control instruction signal into a power signal of the corresponding moving parts of the CNC grinding machine and driving the corresponding moving parts of the CNC grinding machine to move; after the moving part of the CNC grinding machine moves, recording a real-time position of the moving part of the CNC grinding machine through a grating ruler and comparing with a control instruction signal of a servo controller, with a difference therebetween being a corresponding moving error; sending the moving error as a feedback signal to an IPC (Industrial Personal Computer) of the CNC grinding machine; adopting a corresponding PID (Proportional Integral Derivative) control strategy by the IPC of the CNC grinding machine according to the corresponding feedback signal; sending a corresponding control instruction signal to the servo driver again and driving the corresponding moving parts of the CNC grinding machine to move until the moving error corresponding to the feedback signal reaches the control accuracy of an algorithm; repeating an above control process by the digital twin control system to finally achieve the processing requirements of the corresponding product; creating the virtual entities completely corresponding to the physical entities accordingly, and achieving real-time monitoring and optimization of the physical entities through the digital twin data;

the services comprise key information related to the digital twin control system and provide real-time update of status changes in the physical entities and the virtual entities;

connection is a pipeline for transmitting the information between the physical entities and the virtual entities, and the physical entities provide real-time digital twin data for the virtual entities by using an information transmission technology;

the digital twin data comprises data from the CNC grinding machine entities, and status, performance and control data from moving status sensors of the CNC grinding machine;

achieving by the digital twin control system, real-time interaction between the virtual entities and the physical entities in a grinding process through the digital twin data and connections, and conducting real-time simulation and timely optimization, to achieve an accurate control of product quality in the grinding process;

step 2: acquiring real-time spatial data of the workpiece based on the digital twin control system with product quality as the control objective, achieving a precision processing of the workpiece by driving relative motion between the workpiece and the grinding wheel through a CNC grinding machine moving system; achieving the processing of a cylindrical surface in combination with a linear feed motion of the X-axis through a rotational motion of the workpiece and a grinding spindle; achieving the processing of a plane in combination with the linear feed motion of the Z-axis through the rotational motion of the workpiece and the grinding spindle; achieving the processing of a rotary symmetric surface in combination with two-axis interpolation motion of the X-axis and the Z-axis through the rotational motion of the workpiece and the grinding spindle, and achieving a processing of a non-rotary symmetric surface through three-axis interpolation motion of the X-axis, the Z-axis and the C-axis;

extracting theoretical coordinates of each processing point through the digital twin control system accordingly based on that a surface formation of a CNC grinding machine product is related to point-to-point contact points between a tool and the workpiece during processing, and forming a spatial data distribution of the workpiece during processing through coordinate transformation, as shown in formula (1);

$$\begin{cases} X(t) = x_{actual}(t) \cdot \cos(c_{actual}(t)) \\ Y(t) = x_{actual}(t) \cdot \sin(c_{actual}(t)) \\ Z(t) = z_{actual}(t) \end{cases} \quad (1)$$

where $x_{actual}$, $z_{actual}$, and $c_{actual}$ represent actual positions where XZC coordinates pass through in the CNC grinding machine coordinate system during grinding processing respectively, and X(t), Y(t), and Z(t) represent the spatial data distribution of workpiece coordinates respectively;

step 3: calibrating parameters of the digital twin system during actual processing, a processing error is composed of two parts; one part is a processing principle error, and the other part is a dynamic error caused by a processing load, expressed as:

$$Err = f(V_s, V_w, V_f, a_p) + g(E_X, E_Z, E_C, u) + h(F, E) + j(w) \quad (2)$$

where f represents a principle error of grinding processing, comprising a surface grinding mark caused by surface residual height resulting from grinding wheel speed $V_s$, workpiece speed $V_w$, feed rate $V_f$ and grinding depth $a_p$; g represents a principle error of CNC grinding machine motion, comprising a XZC guide rail accuracy $E_X$, $E_Z$ and $E_C$ of the CNC grinding machine, and external interference u during processing; h represents elastoplastic deformation caused by an inherent characteristic E of the material under the action of a grinding force F, j represents elastic recovery, and w represents an influencing parameter of a degree of elastic recovery of the material;

under an ideal status, the processing course is a stationary process; when a planar workpiece is processed, a tool-workpiece contact point is on an ideal trajectory, a processing surface is in a pure flat status, and an error value is 0; if only the dynamic characteristics of the CNC grinding machine are considered, when the planar workpiece is processed, a grinding point of the CNC grinding machine fluctuates, and processing error value fluctuates; when difficult-to-process material is processed, due to the difficulty in processing of the material, the processing load is introduced during processing, causing fluctuation of the tool-workpiece contact point of the CNC grinding machine, and accordingly, the processing error is expressed as:

$$Err = EX(F, E, V_s, V_f, a_p, u) + EZ(F, E, V_w, a_p, u) + \qquad (3)$$
$$EC(F, E, V_w, u)$$

where EX represents an influence of the grinding force F, the inherent characteristic E of the material, the grinding wheel speed $V_s$, the feed rate $V_f$, the grinding depth $a_p$, and the external interference u on an X-axis error; EZ represents the influence of the grinding force F, the inherent characteristic E of the material, the workpiece speed $V_w$, the grinding depth $a_p$ and the external interference u on a Z-axis error; EC represents the influence of the grinding force F, the inherent characteristic E of the material, the workpiece speed $V_w$ and the external interference u on a C-axis error;

by calibrating the parameters of the digital twin control system, establishing a correlation of the processing load—output voltage; wherein when the moving part of the CNC grinding machine is in a balanced position, a position error and output power are zero; during loading, a load on the moving part is increased, generating a forward load Fe+; at this time, the output power is less than an applied load, and a position Xe of the moving part deviates forwardly from an original instruction position; to ensure that the instruction position of the moving part is stable, the output power of the moving part is continuously increased, and a motor power is increased and maintains new stable power output; after the motor power is increased to be consistent with the external load, the position Xe returns to the original instruction position;

when the external load is removed, the load on the moving part is decreased; at this time, the output power of the motor is higher than that of the external load, and the position Xe of the moving part deviates reversely from the original instruction position; to ensure that the instruction position of the moving part is stable, the output power of the motor is decreased, and the power is decreased and maintains new stable power output; after the motor power is reduced to be consistent with the external load, the guide rail position Xe returns to the original instruction position;

accordingly, determining a relationship of the load, a current of a guide rail motor and the position error of the guide rail through load calibration, and then, obtaining real-time load change during processing according to the real-time changes of the current of the guide rail motor and the position error of the guide rail during grinding processing; extracting a real-time position signal of the CNC grinding machine through the digital twin control system, and judging a processing status of a workpiece surface through change conditions, under CNC grinding machine coordinates, of the position signals of the X-axis, the Z-axis and the C-axis under the CNC grinding machine coordinates, to obtain the processing quality of the workpiece:

$$\begin{cases} x_{actual}(t) = x_{instruction}(t) + x_{pe}(t) \\ z_{actual}(t) = z_{instruction}(t) + z_{pe}(t) \\ c_{actual}(t) = c_{instruction}(t) + c_{pe}(t) \end{cases} \qquad (4)$$

where $x_{actual}$, $z_{actual}$ and $c_{actual}$ represent the actual positions where the X, Z and C coordinates pass through under the CNC grinding machine tool coordinate system during grinding processing respectively; $x_{instruction}$, $z_{instruction}$ and $c_{instruction}$ represent instruction positions of XZC coordinates in an NC program after discretized by the NC program of the CNC grinding machine respectively; and $x_{pe}$, $z_{pe}$ and $c_{pe}$ represent influences on three XZC coordinates during grinding processing respectively;

accordingly, converting the real-time position signal of the CNC grinding machine into spatial coordinates:

$$\begin{cases} X(t) = x_{actual}(t) \cdot \cos(c_{actual}(t)) \\ Y(t) = x_{actual}(t) \cdot \sin(c_{actual}(t)) \\ Z(t) = z_{actual}(t) \end{cases} \qquad (5)$$

accordingly, controlling the product processing quality in real time through the digital twin control system;

step 4: obtaining a real-time processing quality of the product through the digital twin control system achieving real-time monitoring and real-time control of the product processing quality according to the digital twin control system, then adjusting processing parameters in real time during processing, and changing the processing load to improve the product processing quality;

in the digital twin control system, regarding a difference between a theoretical position and a real-time position as a result of deviation of actual coordinate values from instruction coordinate values under the dynamic characteristics of the CNC grinding machine, a grinding parameter and material responses during processing:

$$\begin{cases} x_{pe}(t) = X(F, E, V_s, V_f, a_p, u) \\ z_{pe}(t) = Z(F, E, V_w, a_p, u) \\ c_{pe}(t) = C(F, E, V_w, u) \end{cases} \qquad (6)$$

where $X(F, E, V_s, V_f, a_p, u)$ represents the influence of the grinding force F, the inherent characteristic E of the material, the grinding wheel speed $V_s$, the feed speed $V_f$, the grinding depth $a_p$ and the external interference u on deviation of the actual coordinate values of the X-axis from instruction coordinates; $Z(F, E, V_w, a_p, u)$ represents the influence of the grinding force F, the inherent characteristic E of the material, the workpiece speed $V_w$, the grinding depth $a_p$ and the external interference u on the Z-axis error; $C(F, E, V_w, u)$ represents the influence of the grinding force F, the inherent characteristic E of the material, the workpiece speed $V_w$ and the external interference u on the C-axis error;

extracting the error values of the moving part of the CNC grinding machine respectively to obtain error distribution results of product surface data:

$$\begin{cases} X(t) = x_{pe}(t) \cdot \cos(c_{pe}(t)) \\ Y(t) = x_{pe}(t) \cdot \sin(c_{pe}(t)) \\ Z(t) = z_{pe}(t) \end{cases} \qquad (7)$$

accordingly, achieving real-time control of the product processing quality.

\* \* \* \* \*